Feb. 23, 1937.   R. W. MANNING   2,071,415
VALVE ADJUSTING DEVICE
Filed Feb. 23, 1933
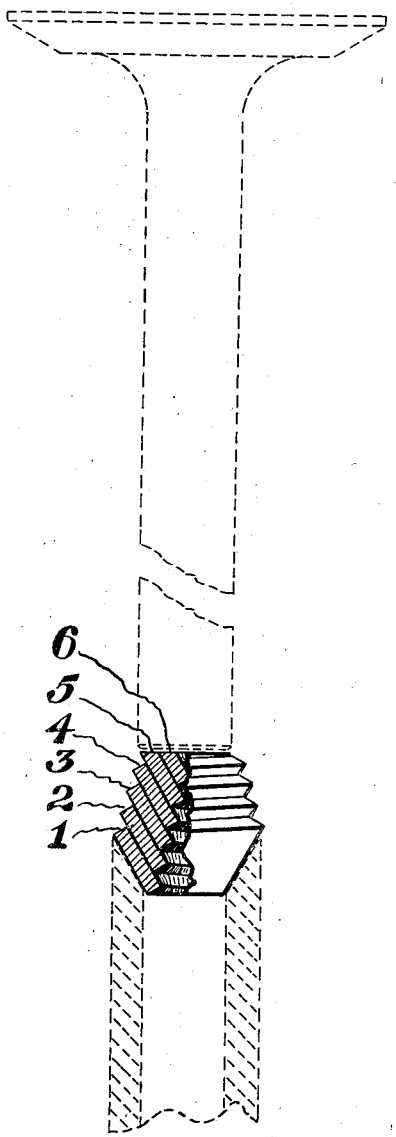
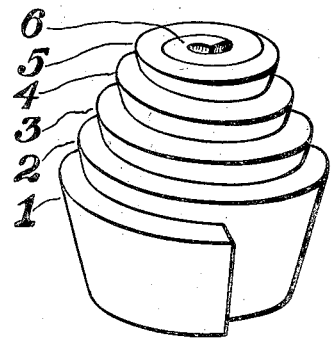
Inventor:
Rodney W. Manning.

UNITED STATES PATENT OFFICE 2,071,415

VALVE ADJUSTING DEVICE

Rodney W. Manning, Riverside, R. I.

Application February 23, 1933, Serial No. 658,030

1 Claim. (Cl. 123—90)

This invention relates to improvements in valve adjusting devices, and is not to be interpreted as being a shock absorber or a spring cushioned silencing device; the object of the invention being to provide an adjustment, which is entirely automatic in action and which will always allow proper seating of a valve.

A further object of the invention is to provide a device of this character which will possess inherent energy for its operation, and be so constructed that wear will be negligible.

Still another object is to provide an adjustment of utmost simplicity; one of extremely light reciprocating weight, and one which can be rapidly and cheaply produced, and easily assembled in proper relation to a valve mechanism.

With these and other objects in view, the invention consists of certain novel features of construction and arrangement as will be more fully hereinafter described and pointed out in the claim.

In the accompanying drawing:

Figure 1 shows a view partly in section showing the invention placed contiguously to members such as might be used in any conventional valve mechanism of an internal combustion engine. As the invention relates to the adjusting member only, the other members are shown in broken lines.

Figure 2 is a perspective view of one of the preferred forms of the invention, in which the device is shown as a one piece unit formed to suitable shape. The drawing represents a structure of spring steel or other suitable material, shaped into a helical formation of cone shaped coils. The invention resides in the unique formation of the structure, and it is to be understood that this is merely one form of carrying out the invention, and various slight changes might be resorted to in construction and arrangement as long as the object of the invention is carried out.

As will be seen by referring to Fig. 1, the bottom coil 1 is given a conical shape, the conical sides being of helical formation. The next succeeding coil 2 is wound within the preceding coil 1 in such a manner that the outer wall of coil 2 bears snugly against the inner wall of coil 1. Coils 3, 4, and 5 nest in a similar manner, while coil 6 is curled within coil 5 to form a flat bearing surface to contact the end of a valve stem, or other member of a valve mechanism.

Fig. 2 clearly shows the formation of the structure, coils 1, 2, 3, 4, 5, and 6 corresponding to the layers shown in section in Fig. 1.

The operation of the device is as follows:

As a tappet is raised to open a valve, a certain pressure or force must be exerted to overcome the resistance of the valve spring. If this force be transmitted through the coils of this invention, the pressure produced will have a tendency to wedge the coils, one within the other, and this wedging tendency will produce a twisting and wrapping action within the structure which will allow the structure to be compressed. The twisting and wrapping movement will create an extrinsic frictional resistance between the walls of the structure, which, in addition to the inherent expanding force exerted by the coils, will produce a snubbing action, thus effectively retarding the yielding movement. The opening of the valve will be reduced by the amount the structure is compelled to yield, and the valve will have this clearance to allow its proper seating.

As soon as the valve seats however, and pressure is relieved, the coils will unwrap, and the structure will expand until the clearance is taken up, and the device will again be in position to repeat the cycle. It will thus be seen that a positive automatic adjustment will be effected by this invention, which is simple, durable and efficient in use, due to the ability of the structure to automatically shorten or lengthen as conditions warrant. Thus, should a valve tend to become "tight" or held off its seat by reason of heat expansion or other causes, the invention would be subjected to the constant pressure exerted by the valve spring. This constant valve spring pressure will cause a compressional movement to take place within the structure, due to a gradual contraction of the unit as previously described. As soon as this compressional movement of the structure provides the proper clearance to allow the valve to seat, the device is free to instantly unwrap and expand again while the valve is inoperative, since the pressure of the valve spring has been arrested upon the valve striking its seat. It will thus be obvious that the clearance shown in Fig. 1 is only present during the actual operation of the device. The ability of the device to rapidly expand will eliminate any excessive slack appearing in the valve train at all times, while the ability of the device to slowly shorten when under compression will always allow sufficient clearance to allow the valve to seat properly under all conditions. The invention therefore automatically assumes a length at all times suited to its function, and insures an absolutely automatic adjustment regardless of heat expansion, "tossing" or synchronization of the valve gear, or any wear which may take place in the valve operating train.

Having described my invention, what I claim new and useful is:

In a valve train, a valve and a pushrod, a valve adjusting device embodying a number of helical coils mounted between said valve and pushrod, said coils telescopically arranged in conical formation for sliding movement one upon the other.

RODNEY W. MANNING.